United States Patent [19]

Asao et al.

[11] Patent Number: 4,508,804

[45] Date of Patent: Apr. 2, 1985

[54] SUPPORT FOR ELECTROGRAPHIC PLATE-MAKING MATERIAL AND A LITHOGRAPHIC PRINTING PLATE EMPLOYING SAME

[75] Inventors: Yasuzi Asao; Tetsuro Fuchizawa, both of Shizuoka, Japan

[73] Assignee: Fuji Photo Film Co., Ltd., Kanagawa, Japan

[21] Appl. No.: 541,635

[22] Filed: Oct. 13, 1983

[30] Foreign Application Priority Data

Oct. 13, 1982 [JP] Japan ............................... 57-179377

[51] Int. Cl.$^3$ ........................ G03G 5/14; B32B 27/08; B32B 27/10

[52] U.S. Cl. ........................................ 430/62; 430/49; 430/60; 430/64; 428/511; 428/516

[58] Field of Search ....................... 430/49, 60, 62, 64; 428/511, 516

[56] References Cited

U.S. PATENT DOCUMENTS

| | | | |
|---|---|---|---|
| 4,269,937 | 5/1981 | Asanuma et al. | 428/511 X |
| 4,352,861 | 10/1982 | Von Meer et al. | 428/511 |
| 4,357,404 | 11/1982 | Osawa et al. | 430/49 |

FOREIGN PATENT DOCUMENTS

| | | | |
|---|---|---|---|
| 2,727,223 | 12/1978 | Fed. Rep. of Germany | 430/49 |
| 54-14804 | 2/1979 | Japan | 430/49 |

*Primary Examiner*—Roland E. Martin
*Attorney, Agent, or Firm*—Sughrue, Mion, Zinn, Macpeak and Seas

[57] ABSTRACT

A support for electrophotographic plate-making material comprising (1) a paper base; (2) a polyolefin layer on both sides of the paper base, wherein the polyolefin layer has a volume electric resistance of $10^{10}\Omega$ or less; and (3) an ionomer coated between the paper base and the polyolefin layer, wherein the ionomer is prepared by ion-crosslinking a copolymer comprising at least one $\alpha$-olefin and at least one $\alpha,\beta$-ethylenically unsaturated carboxylic acid with a monovalent, divalent or trivalent ion of a metal of Group I, II, III, IV-A or VIII of the periodic table.

15 Claims, No Drawings

SUPPORT FOR ELECTROGRAPHIC PLATE-MAKING MATERIAL AND A LITHOGRAPHIC PRINTING PLATE EMPLOYING SAME

FIELD OF THE INVENTION

This invention relates to an improved support for an electrophotographic plate-making material capable of producing a lithographic printing plate by electrophotography and a lithographic printing plate using the same.

BACKGROUND QF THE INVENTION

Processes for making lithographic printing plates by electrophotography are well known. Lithographic printing plates are generally prepared by uniformly charging and imagewise exposing a photoconductive layer of an electrophotographic plate-making material, developing the material in a wet or dry manner to obtain a toner image, fixing the resulting image, and treating the material with a desensitizing solution (etching solution) to render the toner-free non-image areas hydrophilic.

Usually, the electrophotographic plate-making materials described above have a paper support. However, lithographic printing plates prepared using these materials have a printing durability of only about 3,000 copies. The poor durability is due to penetration of water into the paper support. That is, after plate-making, penetration of an etching solution (aqueous solution) takes place upon the desensitizing non-image areas. Further, penetration of dampening water takes place during printing. Thus, the paper support absorbs water and stretches. In an extreme case, the water absorbtion causes delamination between the paper support and the photoconductive layer.

In addition, when using the materials described above, the image quality is such that stable reproducible half tone dots are only about 100 lines/inch. This may be attributed to the moisture content of the support which varies depending upon the temperature and humidity of the atmosphere employed upon exposure. As a result, the electric conductance varies which adversely affects the photographic properties.

Various proposals have been made for removing these problems.

One such proposal is to provide an interlayer between a base paper used as a support and a photoconductive layer. For example, Japanese patent application (OPI) No. 138904/75 describes providing an epoxy resin interlayer; Japanese patent application (OPI) No. 105580/80 describes providing an interlayer comprising an ethylene derivative such as an ethylene-acrylic acid copolymer, ethylene-methacrylic acid copolymer, ethylene-vinyl acetate copolymer, ethylene-vinyl acetate-vinyl chloride terpolymer or the like; and Japanese patent application (OPI) No. 14804/79 describes providing an interlayer by coating an aqueous polyethylene emulsion of carbon black or graphite and drying it.

However, none of the electrophotographic plate-making materials having the above-described interlayer give rise to lithographic printing plates having excellent printing durability.

SUMMARY OF THE INVENTION

It is therefore an object of the present invention to provide a support for an electrophotographic plate-making material having good dimensional stability and capable of providing a lithographic printing plate having excellent printing durability.

Another object of the present invention is to provide an electrophotographic plate-making material whose photographic properties vary hardly as a result of changes in temperature and humidity.

A further object of the present invention is to provide an electrophotographic plate-making material having excellent handling properties, particularly excellent adaptability to an automatic plate-making machine.

As a result of various investigations, it has been found that the above-described objects can be obtained by using a support for electrophotographic plate-making material comprising:

(1) a paper base;

(2) a polyolefin layer on both sides of said paper base, wherein said polyolefin layer has a volume electric resistance of $10^{10}\Omega$ or less; and (3) an ionomer coated between said paper base and said polyolefin layer, wherein said ionomer is prepared by ion-crosslinking a copolymer comprising at least one $\alpha$-olefin and at least one $\alpha,\beta$-ethylenically unsaturated carboxylic acid with a monovalent, divalent or trivalent ion of a metal of Group I, II, III, IV-A or VIII of the periodic table.

DETAILED DESCRIPTION OF THE INVENTION

The electrophotographic plate-making material using the support of the present invention is found to have the following advantages: (1) the polyolefin layer is not delaminated from the paper base at the edges (cuts) due to friction that arises upon printing; (2) in the process of fixing the toner by heating, blisters, formed as a result of a volatile ingredient (water) contained in the paper base, are rarely seen between the polyolefin layer and the base plate; and (3) the volume electric resistance is not increased and is less local. Thus, excellent images can be obtained.

Examples of the above-described polyolefin used in the present invention include polyethylene and polypropylene. Polyethylene with a density of 0.9 to 0.96, a melt index of 1.0 to 30 g/10 min., a mean molecular weight of 20,000 to 50,000, a softening point of 100° to 130° C., and a tensile strength of 130 to 300 Kg/cm$^2$ is particularly preferable. Polypropylene with a density of 0.85 to 0.92, a melt index of 1.0 to 30 g/10 min., a softening point of 75° to 170° C., and a tensile strength of 280 to 420 Kg/cm$^2$ is also particularly preferable. Of these, polyethylene is most preferable.

An electroconductive substance is incorporated in the polyolefin laminate layer so as to give the support a volume electric resistance of $10^{10}\Omega$ or less. In this manner, changes in the photographic properties due to changes in humidity (especially in the case of a low humidity) can be suppressed and a lithographic printing plate with high printing durability capable of providing good image quality can be obtained.

Particularly preferable electroconductive substances used in the present invention include metal oxides, particularly oxides of metals selected from the group consisting of zinc, magnesium, tin, barium, indium, molybdenum, aluminum, titanium, and silicon. Fine particles of crystalline oxides or composite oxides thereof, or carbon black are preferred. Those are described in French Pat. No. 2,277,136 and U.S. Pat. No. 3,597,272.

Of these, carbon black is advantageous since it provides a good conductivity when used in a small amount and is easily mixed with the polyolefin.

The electroconductive substances are used in an amount such that the volume electric resistance of the support is $10^{10}\Omega$ or less, preferably $10^8\Omega$ or less, most preferably $10^6\Omega$ or less. The amount used to obtain the above-described electric resistance is not definitely determined since it varies depending upon the types of paper base, polyolefin, and electroconductive substance employed. However, generally the amount of electroconductive substance ranges from 5 to 30 wt % based on the amount of polyolefin.

The above-described polyolefin is provided on both sides of a paper base. A laminating method is most preferable for providing the polyolefin on the paper. By providing the polyolefin on both sides of the paper base using the laminating method, an electrophotographic plate-making material can be obtained which enables one to make a lithographic printing plate having excellent image quality and printing durability.

Examples of the laminating method are well known in the art, e.g., a wet method, a dry method, a hot-melt method, an extrusion method, etc. The extrusion method is particularly preferred in the present invention. The extrusion method is a process which comprises melting polyolefin, filming it, immediately pressing it onto a paper base, and cooling the resulting laminate. Various apparatuses are known for conducting the laminating method.

The polyolefin layer thus provided on the paper base preferably has a thickness of 5 to 50μ. If the thickness is less than 5μ, the waterproofness of the base paper is insufficient. If the thickness is more than 50μ, greater improvement of the properties is not obtained, but the production cost is increased. A thickness of 10 to 30μ is more preferable.

In the present invention, an ionomer of a copolymer of α-olefin and α,β-ethylenically unsaturated carboxylic acid is coated on the surface of a paper base prior to application of the polyolefin layer.

The α-olefin to be used in the present invention is a substance represented by the general formula $RCH=CH_2$ (wherein R represents a hydrogen atom or a hydrocarbyl group containing 1 to 8 carbon atoms). Specific examples of the α-olefin include ethylene, propylene, butene-1, styrene, pentene-1, hexene-1, heptene-1, 3-methylbutene-1, 4-methyl-butene-1, etc. Of these, ethylene is most preferable from the point of view of adhesion strength.

The α,β-ethylenically unsaturated carboxylic acid to be used in the present invention contains 3 to 10, preferably 3 to 6, more preferably 3 to 4 carbon atoms and contains preferably 1 to 2 carboxyl groups. Specific examples of the α,β-unsaturated carboxylic acid include acrylic acid, methacrylic acid, α-ethyl acrylic acid, itaconic acid, maleic acid, fumaric acid, a monoester dicarboxylic acid (e.g., monoethyl fumarate), maleic anhydride, and other α,β-ethylenically unsaturated carboxylic acid anhydrides. Of these, acrylic acid, methacrylic acid, α-ethyl acrylic acid, and itaconic acid are preferable from the point of view of adhesion strength, with acrylic acid and methacrylic acid being particularly preferable.

The content of the α,β-ethylenically unsaturated carboxylic acid in the copolymer ranges from 0.2 to 40 mol %, preferably from 0.5 to 25 mol %, more preferably from 0.8 to 20 mol %. If the content is less than 0.2 mol %, the adhesive properties are insufficient. If the content is more than 40 mol %, the characteristics of the ethylene ingredient are lost which leads to a reduction in the adhesion strength of the polyolefin.

The metal in the ionomer to be used in the present invention can be a monovalent, divalent or trivalent metal of Group I, II, III, IV-A or VIII of the periodic table. Specific examples of the metal include $Na^+$, $K^+$, $Ca^{++}$, $Mg^{++}$, $Zn^{++}$, $Ba^{++}$, $Fe^{++}$, $Co^{++}$, $Ni^{++}$, $Fe^{+++}$, and $Al^{+++}$. Of these, $Na^+$, $K^+$, $Mg^{++}$, $Ca^{++}$, and $Zn^{++}$ are particularly preferable.

The degree of ion-cross linking by the metal ions is defined by the degree of neutralization of the carboxyl groups with such metal ions. The degree of neutralization is in the range of from 5 to 97%, preferably from 10 to 95% and more preferably from 20 to 90%. If the neutralization degree is less than 5% or more than 97%, the adhesion force is reduced.

The copolymer used in the present invention is not necessarily a two-component polymer comprising only an α-olefin and an α,β-ethylenically unsaturated carboxylic acid. That is, in order to impart hydrocarbon properties to the copolymer, two or more α-olefins may be used and two or more α,β-ethylenically unsaturated carboxylic acids may be used. Further, any of a third copolymerizable monomer may be used in combination with the α-olefin and the α,β-ethylenically unsaturated carboxylic. Preferable monomers include vinyl esters, acrylic esters containing up to 8 carbon atoms such as methyl acrylate and ethyl acrylate, and methacrylic esters containing up to 8 carbon atoms, such as methyl methacrylate and ethyl methacrylate.

Specific examples of the copolymer include ethylene/acrylic acid copolymer, ethylene/methacrylic acid copolymer, ethylene/itaconic acid copolymer, an ethylene/monomethyl maleate copolymer, ethylene/-maleic acrylonitrile copolymer, copolymer, ethylene/a-crylic acid/methyl methacrylate copolymer, ethylene/-methacrylic acid/methyl methacrylate copolymer, ethylene/itaconic acid/methyl methacrylate copolymer, ethylene/monomethyl maleate/ethyl acrylate copolymer, ethylene/acrylic acid/vinyl alcohol copolymer, ethylene/propylene/acrylic acid copolymer, ethylene/styrene/acrylic acid copolymer, ethylene/-methacrylic acid/isobutyl acrylate copolymer, an ethylene/methacrylic acid/acrylonitrile copolymer, a propylene/acrylic acid copolymer, ethylene/fumaric acid/vinyl methyl ether copolymer, ethylene/vinyl cholride/acrylic acid copolymer, ethylene/vinylidene chloride/acrylic acid copolymer, ethylene/methacrylic acid/acrylic acid copolymer, ethylene/butene-1/acrylic acid copolymer, ethylene/itaconic acid/acrylonitrile copolymer, ethylene/α-ethylacrylic acid copolymer, ethylene/monomethyl maleate/vinyl alcohol copolymer, etc. Of these, ethylene/acrylic acid copolymer, ethylene/methacrylic acid copolymer, and ethylene/itaconic acid copolymer are most preferable. Many of these ionomers are commercially available. Most preferable ionomer is an aqueous emulsion type. These ionomers are allowed to exist on the surface of the paper base to improve the adhesive properties between the paper base and polyolefin.

Accordingly, as a process of providing an ionomer on the surface of a paper base, it is preferable to coat the ionomer on the paper base surface in the final stage of a paper-making process or immediately before extrusion coating. More specifically, a process of conducting surface-sizing with an ionomer solution by size-pressing in a paper-making process, and a process of applying an ionomer solution to the paper surface by ordinary roll coating, bar coating or the like at the end of the paper-making process or immediately before extrusion coating are preferable.

The ionomers of the present invention are preferably used as an emulsion. This emulsion is used as an aqueous solution. However, in view of the coating properties, a water-miscible solvent, such as ethanol, may be partly mixed therewith.

The coating amount of the ionomer is preferably 0.01 to 5.0 $g/m^2$ as a solid, and more preferably 0.10 to 2.5 $g/m^2$.

Any conductive paper base conventionally used for electrophotographic light-sensitive materials may be employed, as the paper base to be used in the present invention. For example, those prepared by impregnating paper with electroconductive substances such as a carbon or inorganic metal comounds described in U.S. Pat. No. 3,597,272 and French Pat. No. 2,277,136, or carbon; those prepared by mixing these substances upon making the paper; and synthetic papers described in Japanese Patent Publication Nos. 4239/77 and 19031/78, and U.S. Pat. No. 4,064,304 can be used. The paper base desirably has a base weight of 50 to 200 $g/m^2$ and a thickness of 50 to 200$\mu$.

The photoconductive layer to be provided on the support as described above comprises a photoconductive substance and a binder. As the photoconductive substance, inorganic photoconductive substances such as zinc oxide, cadmium sulfide, titanium oxide, etc. and organic photoconductive substances such as phthalocyanine dyes can be used. As the binder, silicone resin, polystyrene, polyacrylic ester or polymethacrylic ester, polyvinyl acetate, polyvinyl chloride, polyvinyl butyral, and their derivatives can be used. The weight ratio of the photoconductive substance to binder suitably ranges from 3:1 to 20:1. If necessary, sensitizing agents and coating aids used for coating may further be added to the layer.

The photoconductive layer is provided on the polyolefin coating layer of the support. It is preferable to preliminarily subject the surface of the polyolefin coating layer to surface treatment such as corona discharge treatment, glow discharge treatment, flame treatment, UV ray treatment, ozone treatment, plasma treatment, etc. for improving the adhesion force of the photoconductive layer. The thickness of the thus provided photoconductive layer suitably ranges from 5 to 30$\mu$.

A lithographic printing plate can be made using the lithographic plate-making material obtained by coating the photoconductive layer on the support of the present invention in a conventionally known manner. For example, the photoconductive layer can be uniformly charged by a corona charging method or the like and imagewise exposed to form an imagewise charged image. Then, toner particles are imagewise deposited in a wet or dry manner and fixed by heating or the like. Next, non-image areas, to which no toner particles are deposited, are rendered hydrophilic by treatment with a desensitizing solution. As the desensitizing solution, a composition containing a ferrocyanide or ferricyanide as described in U.S. Pat. No. 4,116,698 or a composition containing a metal complex as described in U.S. Pat. No. 4,282,811 can be used. 10,000 or more copies with excellent image quality can be obtained by oridinary offset printing using the thus prepared lithographic printing plate.

The support of the present invention has a polyolefin layer provided thereon by a laminating method and has a volume electric resistance of $10^{10}\Omega$ or less. In addition, an ionomer is preliminarily coated on a paper base for improving the adhesion force between the polyolefin layer and the paper base. Thus, the present invention is advantageous since no solvents are used in providing the polyolefin layer such that conductance and uniformity on the paper base is not deteriorated and good image quality can be obtained.

In comparison, when a solvent is used, as described in Japanese patent application (OPI) No. 105580/80, the electrophotographic properties are not satisfactory.

While a conventional sample can reproduce only a 100 lines/inch halftone dot image by a wet-process development, a sample of the present invention can reproduce a 133 lines/inch halftone dot image.

Japanese patent application (OPI) No. 14804/79 describes forming a precoat layer by coating an aqueous dispersion prepared by mixing a low molecular weight polyethylene emulsion, an aqueous dispersion of fine polyethylene powder or a self-emulsifiable polyethylene emulsion with carbon black. However, it is difficult to provide carbon black or polyethylene as a microscopic uniform film by this process due to penetration of the coating solution into the paper base. In addition, sedimentation can take place in the production step. Thus, inadequate properties, e.g., poor waterproofness and poor adhesion between the base plate and the above-described precoat layer results. The present invention does not give rise to such problems because the polyolefin layer is provided by a laminating method.

In addition, since in the present invention, the ionomer-coated paper base having a polyolefin laminate layer on the ionomer-coated surface is used as a support, delamination of the polyolefin layer from the paper by friction upon printing, formation of blisters upon heat-fixing toner particles, and increases in unevenness in volume electric resistance are suppressed.

Volume electric resistance is determined by sandwiching a sample between two metallic circular electrodes having a radius of 2.5 cm, applying a direct potential of V, reading a current value A, and calculating according to the following equation:

$$\text{volume electric resistance, } R_V = \frac{V}{A}\ (\Omega)$$

The volume electric resistance of the support greatly influences the performance of a resulting electrophotographic printing plate. The volume electric resistance is influenced by the volume intrinsic electric resistance and the thickness of the support.

The support in accordance with the present invention is of a composite type. Its volume intrinsic resistance depends upon the volume intrinsic resistance of the base paper and the conductive substance-containing laminate layer, and the ratio of the thickness of the base paper to that of the laminate layer. Therefore, the volume electric resistance of the support is presented as a resistance value obtained by measuring the current as described above.

The present invention will now be described in more detail by the following examples of preferred embodiments of the present invention. The examples are in no way meant to be construed as limiting the present invention. "%'s" and "parts" are by weight unless otherwise specified.

EXAMPLE 1

A 5% aqueous solution of calcium chloride was coated on a 100 g/$m^2$ woodfree paper in an amount of 20 g/$m^2$. The coated paper was then dried to obtain a conductive base paper. A coating solution having the following formulation was coated on each side of the paper in a dry amount of 0.5 g/$m^2$, and dried.

| | |
|---|---|
| 50% Emulsion of ionomer solids (ethylene: 95 mol %; acrylic acid: 5 mol %; neutralization degree: 85%; metal: $Na^+$) | 20 g |
| Water | 80 ml |

A support of the present invention was obtained using pellets, prepared by melt-kneading 85% polyethylene (density: 0.92; melt index: 3.0 g/10 min) and 15% conductive carbon, that were subjected to an extrusion method so as to be laminated on each side of the paper base in a thickness of 25μ. This support had a volume electric resistance of $5\times10^8\Omega$. Next, the surface of the polyethylene layer on one side of the support was subjected to corona discharge treatment using 5 KVA.-sec/$m^2$. Then, a coating solution of the following formulation was coated thereon in a dry coating amount of 20 g/$m^2$ and dried to provide a photoconductive layer.

| | |
|---|---|
| Photoconductive zinc oxide (Sazex Model 2000 made by Sakai Chemical Industry Co., Ltd.) | 100 parts |
| Silicone resin (KR-211 made by Sin-etsu Chemical Industry Co., Ltd.) | 35 parts |
| Rose Bengale | 0.1 part |
| Fluorescein | 0.2 part |
| Methanol | 10 parts |
| Toluene | 150 parts |

The thus obtained electrophotographic plate-making material was left in a dark room for 12 hours at 25° C. and 45% RH. The material was then made into a printing plate using a plate-making machine Model 135 (made by Itels corporation).

No blisters were formed on the plate as it passed through a zone for heat-fixing toner particles (panel heater 90° C., 10 sec). The resulting plate was desensitized with an etching solution, made by Addressograph Multigraph Corporation and mounted on an offset printing press, Hamada Star 700, Printing was conducted to obtain more than 10,000 copies with an excellent reproducing quality for a 133 lines/inch halftone dot image.

EXAMPLE 2

A 6% aqueous solution of polyvinylbenzyltrimethylammonium chloride was coated on a 130 g/$m^2$ woodfree paper in an amount of 20 g/$m^2$. The coated paper was then dried to obtain a conductive paper base. A coating solution having the following formulation was coated on each side of the paper in a dry amount of 0.8 g/$m^2$, and dried.

| | |
|---|---|
| 50% Emulsion of ionomer solids (ethylene: 90 mol %; methacrylic acid: 10 mol %; neutralization degree: 90%; metal: $K^+$) | 20 g |
| Water | 80 ml |

A support of the present invention was obtained using pellets, prepared by melt-kneading 85% polyethylene (density: 0.95; melt index: 5.0 g/10 min) and 15% conductive carbon, that were subjected to an extrusion method so as to be laminated on each side of the paper base in a thickness of 25μ. This support had a volume electric resistance of $8\times10^8\Omega$. Next, one of the polyethylene layers was subjected to corona discharge treatment as in Example 1 to provide a photoconductive layer.

A lithographic printing plate obtained from the resulting electrophotographic plate-making material contained no blisters and when offset printing was conducted, 10,000 good quality were obtained.

While the invention has been described in detail and with reference to specific embodiments thereof, it will be apparent to one skilled in the art that various changes and modifications can be made therein without departing from the spirit and scope thereof.

We claim:

1. A lithographic printing plate comprising:

(A) a support and (B) a photoconductive layer coated on said support, wherein said support is a support for electrophotographic plate-making material having a volume-electrric resistance of $10^{10}\Omega$ or less and comprising:

(1) a paper base;

(2) a polyolefin laminate layer on both sides of said paper base; and (3) an ionomer coated between said paper base and said polyolefin laminate layer, wherein said ionomer is prepared by ion-cross linking a copolymer comprising at least one α-olefin and 0.2 to 40 mol % of at least one α,β-ethylenically unsaturated carboxylic acid with a monovalent, divalent or trivalent ion of a metal of Group I, II, III, IV-A or VIII of the periodic table, said metal ion providing a degree of neutralization of the carboxylic groups in the range of from 5 to 97%.

2. The lithographic printing plate as claimed in claim 1 wherein said polyolefin laminate layer is subjected to corona discharge treatment, glow discharge treatment, flame treatment, UV ray treatment, ozone treatment, or plasma treatment prior to having said photoconductive layer provided thereon.

3. The lithographic printing plate as claimed in claim 1 wherein the thickness of said photoconductive layer ranges from 5 to 30μ.

4. A support for electrophotographic platemaking material comprising:

(1) a paper base;

(2) a polyolefin laminate layer on both sides of said paper base; and (3) an ionomer coated between said paper base and said polyolefin laminate layer, wherein said ionomer is prepared by ion-crosslinking a copolymer comprising at least one α-olefin and 0.2 to 40 mol % of at least one α,β-ethylenically unsaturated carboxylic acid with a monovalent, divalent or trivalent ion of a metal of Group I, II, III, IV-A or VIII of the periodic table, wherein said metal ion provides a degree of neutralization of the carboxylic groups in the range of from 5 to 97%, said support having a volume-electric resistance of $10^{10}\Omega$ or less.

5. The support as in claim 4 wherein said polyolefin is selected from the group consisting of polyethylene and polypropylene.

6. The support as in claim 4 wherein said polyolefin laminate layer contains an electroconductive substance selected from the group consisting of fine particles of metal oxides and carbon black.

7. The support as in claim 4 wherein said volume electric resistance is $10^8\Omega$ or less.

8. The support as in claim 4 wherein said α-olefin is represented by the general formula $RCH=CH_2$, wherein R represents a hydrogen atom or a hydrocarbyl group containing 1 to 8 carbon atoms.

9. The support as in claim 4 wherein said α-olefin is selected from the group consisting of ethylene, propylene, butene-1, styrene, pentene-1, hexene-1, heptene-1, 3-methyl-butene-1, and 4-methyl-butene-1.

10. The support as in claim 4 wherein said α,β-ethylenically unsaturated carboxylic acid contains from 3 to 4 carbon atoms and 1 to 2 carboxylic groups.

11. The support as in claim 4 wherein said metal ion is selected from the group consisting of $Na^+$, $K^+$, $Ca^{++}$, $Mg^{++}$, $Zn^{++}$, $Ba^{++}$, $Fe^{++}$, $Co^{++}$, $Ni^{++}$, $Fe^{+++}$, and $Al^{+++}$.

12. The support as in claim 4 wherein a copolymerizable monomer is used in combination with said α-olefin and said α,β-ethylenically unsaturated carboxylic acid.

13. The support as in claim 4 wherein said polyolefin laminate layer has a thickness of 5 to 50μ.

14. The support as in claim 5 wherein said ionomer is coated in an amount from 0.01 to 5.0 $g/m^2$.

15. The support as in claim 4 wherein said base paper has a base weight of 50 to 200 $g/m^2$ and a thickness of 50 to 200μ.

* * * * *